(12) United States Patent
Lee et al.

(10) Patent No.: US 7,721,316 B2
(45) Date of Patent: May 18, 2010

(54) TV AND CONTROL METHOD OF THE SAME

(75) Inventors: Jae Kyung Lee, Daeku (KR); Myoung Hwa Ko, Gumi (KR)

(73) Assignee: LG Electronics Inc., Seoul (KR)

( * ) Notice: Subject to any disclaimer, the term of this patent is extended or adjusted under 35 U.S.C. 154(b) by 1154 days.

(21) Appl. No.: 09/842,082

(22) Filed: Apr. 26, 2001

(65) Prior Publication Data
US 2001/0037505 A1 Nov. 1, 2001

(30) Foreign Application Priority Data
Apr. 27, 2000 (KR) ................ 2000-22560

(51) Int. Cl.
H04N 7/173 (2006.01)
(52) U.S. Cl. ...................... 725/110; 725/131
(58) Field of Classification Search ............ 725/37, 725/108, 107, 109, 110; 715/736, 739, 705
See application file for complete search history.

(56) References Cited
U.S. PATENT DOCUMENTS

| | | | | |
|---|---|---|---|---|
| 5,872,588 | A * | 2/1999 | Aras et al. ................. | 725/14 |
| 6,505,243 | B1 * | 1/2003 | Lortz ........................ | 709/220 |
| 6,542,897 | B2 * | 4/2003 | Lee ........................... | 707/102 |
| 6,629,134 | B2 * | 9/2003 | Hayward et al. .......... | 709/217 |
| 6,665,425 | B1 * | 12/2003 | Sampath et al. .......... | 382/112 |
| 6,757,837 | B1 * | 6/2004 | Platt et al. ................. | 714/4 |
| 2004/0024657 | A1 * | 2/2004 | Wright et al. ............. | 705/27 |
| 2004/0093370 | A1 * | 5/2004 | Blair et al. ................ | 709/200 |
| 2005/0137762 | A1 * | 6/2005 | Rother ...................... | 701/29 |

FOREIGN PATENT DOCUMENTS

| | | | | |
|---|---|---|---|---|
| JP | 06008594 | A | * | 1/1994 |
| JP | 06217222 | A | * | 8/1994 |
| JP | 11134018 | A | * | 5/1999 |

OTHER PUBLICATIONS

"Real-Time Error Mapping of a Memory Basic Storage Module or System with No Performance Degradation to the System", IBM Techincal Disclosure, vol. 28, p. 1567, published in Sep. 1985.*
www.dictionary.com, Definition for television.*

* cited by examiner

*Primary Examiner*—Christopher Kelley
*Assistant Examiner*—Usha Raman
(74) *Attorney, Agent, or Firm*—KED & Associates, LLP

(57) ABSTRACT

The present invention relates to a TV and a control method of the same which is capable of displaying function information or an error checkup menu etc. of a TV in accordance with a request of a user, in particular to a TV in accordance with the present invention comprises a service-related site server for providing function information and error item information of a product, a storing unit for storing proper information of the product and contact information of the service-related site, and a controlling unit for displaying the function information on a screen of the product by using the contact information and proper information and controlling in order to restore automatically an error occurred in the product, accordingly a user can be provided product information easily and an error occurred in a TV can be restored automatically.

10 Claims, 7 Drawing Sheets

TV AND CONTROL METHOD OF THE SAME

BACKGROUND OF THE INVENTION

1. Field of the Invention

The present invention relates to a TV (television), in particular to a TV (Television) and a control method of the same which is capable of providing error checkup and function information of the TV.

2. Description of the Prior Art

Recently, a method for transmitting a broadcast signal has been developed along with technology development about a TV, according to it interest about a digital TV adapting a digital transmission method is on the increase.

Generally, a digital broadcast means transmitting a transport stream, herein the transport stream is a digital signal as video, audio, data and broadcast information are temporal-multiplexed by packet units. More detailed description about the transport stream is mentioned in an international standard 'ISO (International Standard Organization)/IEC (International Electro-technical Commission) 13818'.

Data such as interactive broadcast data, program downloading data, a software program etc. can be comprised in the transport stream.

In the meantime, the broadcast signal comprises a tuning frequency required for a broadcast reception, a packet identifier for identifying a packet of a video/audio/data signal, and broadcast scheduling information. Herein, the broadcast information adapts a different standard according to each broadcast method.

Recently, technology development about the digital TV is proceeding actively, performing a test broadcast or a regular broadcast about the digital TV is possible in the present phase.

Hereinafter, a construction of a general digital TV according to the prior art will be described with reference to accompanying FIG. 1.

FIG. 1 is a block diagram illustrating a construction of a general digital TV in accordance with the prior art.

As depicted in FIG. 1, the general digital TV comprises a tuner 101 for tuning in to a broadcast signal of a user selection channel among broadcast signals of each channel received through an antenna, an analog/digital converter 104 for converting the user selection broadcast signal into a digital signal, a link 105 for correcting an error by demodulating the digital signal, converting it into a transport stream format and outputting it, a remote controller interface 102 for inputting a user request signal, a controlling unit 106 for demultiplexing the transport stream in accordance with the user request signal or outputting a control signal for controlling the tuner 101, a MPEG (Moving Picture Expert Group) A/V (Audio/Video) decoder 107 for being inputted the demultiplexed signal from the controlling unit 106, converting it into decoded audio and video signals and outputting them, a NTSC (National Television System Committee) encoder 108 for outputting a luminance signal and a color signal by encoding the decoded video signal in order to display it on a screen, a digital/analog converter 112 for converting a digital audio signal into an analog audio signal and outputting it in order to output the decoded audio signal through a speaker, a SDRAM (Synchronous Dynamic Random Access Memory) 103 for storing data required in the decoding process, a DRAM (Dynamic Random Access Memory) 111 for storing temporary data in accordance with a control operation of the controlling unit 106, and a flash memory 109 for storing a program for a control operation of the controlling unit 106. The operation of the general digital TV will now be described as below.

First, the tuner 101 tunes in to a broadcast signal of a user selection channel among broadcast signals of each channel received through the antenna. Herein, the controlling unit 106 makes a transmitter corresponding to a broadcast signal of the user selection signal convert into an intermediate frequency (497.5 MHz) by transmitting a frequency value of a certain transmitter among transmitters having a different frequency value at every transmitter (not shown) to a PLL (Phase Locked Loop) (not shown) inside the tuner 101.

After that, the tuner 101 outputs the broadcast signal of the user selection channel into the A/D converter 104.

The A/D converter 104 is inputted the broadcast signal of the user selection channel, converts in into a digital signal, and outputs it to the link 105.

The link 105 is inputted the digital signal, demultiplexes it, corrects an error, converts it into a transport stream format, and outputs it to the controlling unit 106 through a bus line. Herein, the controlling unit 106 includes a CPU, a demultiplexer, and a communication port etc. The transport stream means a digital signal as a video signal, an audio signal, data and broadcast information are temporal-multiplexed by packet units.

After that, the demultiplexer of the controlling unit 106 is inputted the transport stream, and outputs it as the demultiplexed video signal, audio signal, and additional information to the MPEG A/V decoder 107. Herein, the demultiplexing means detecting a packet identifier included in the broadcast signal and discriminating it into a video signal sequence, an audio signal sequence, and an additional information sequence.

The MPEG A/V decoder 107 is inputted the demultiplexed video and audio signals, converts them into decoded video and audio signals by passing through the SDRAM 103, and outputs them. Herein, data base structuring of the additional information is performed in order to be displayed with a GUI (Graphic User Interface).

The NTSC encoder 108 outputs a luminance signal and a color signal by encoding the decoded video signal outputted from the MPEG A/V decoder 107 into a NTSC signal in order to display it on a screen.

The D/A converter 112 converts the decoded audio signal outputted from the MPEG A/V decoder 107 into an analog audio signal, and outputs it to a speaker.

In the meantime, the network interface 110 is for performing a two-way communication such as an internet etc., control-related data is transmitted/received to the controlling unit 106 through the bus line, and video and audio related-data is outputted to the MPEG A/V decoder 107 though the bus line.

However, the digital TV in accordance with the prior art can not check an error of itself, and it can not recover the error automatically.

In addition, when there is a question about the TV from a user, the digital TV in accordance with the prior art can not provide each function information according to the question through the network interface, accordingly it is inconvenient for the user.

SUMMARY OF THE INVENTION

The object of the present invention is to provide a TV and a control method of the same which is capable of providing error checkup or function information etc. of a TV according to a request of a user.

In addition, the other object of the present invention is to provide a TV and a control method of the same which is capable of recovering an error of a TV automatically.

In order to achieve the objects of the present invention, in an apparatus for reproducing video and audio signals by receiving a broadcast signal, the TV in accordance with the present invention comprises a storing unit for storing proper information of a product and contact information of a certain site, and a controlling unit for controlling in order to display information corresponding to function information of the product and an error checkup menu on a screen by using the proper information of the product and contact information.

In order to achieve the objects of the present invention, the control method of the TV in accordance with the present invention comprises transmitting the proper information of the product to the certain site, receiving service menu information corresponding to the product, receiving information selected by a user in the service menu information, and displaying the selected information on a screen.

DETAILED DESCRIPTION OF THE PREFERRED EMBODIMENT

Hereinafter, a digital TV and a control method of the same in accordance with the present invention will now be described in detail with reference to accompanying FIGS. 2~6.

Figure 1:
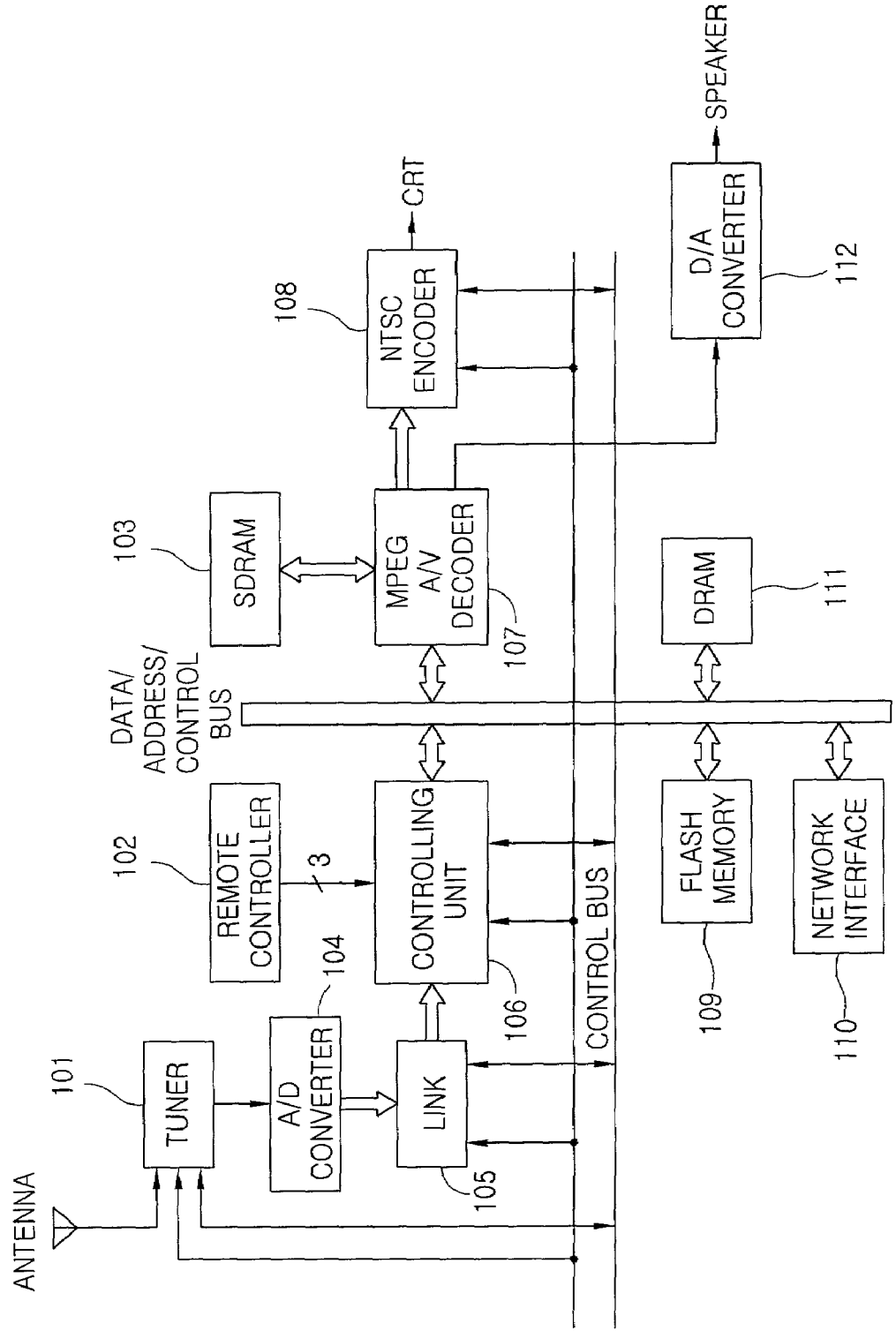
FIG. 1 is a block diagram illustrating a construction of a general digital TV in accordance with the prior art.
Figure 2:
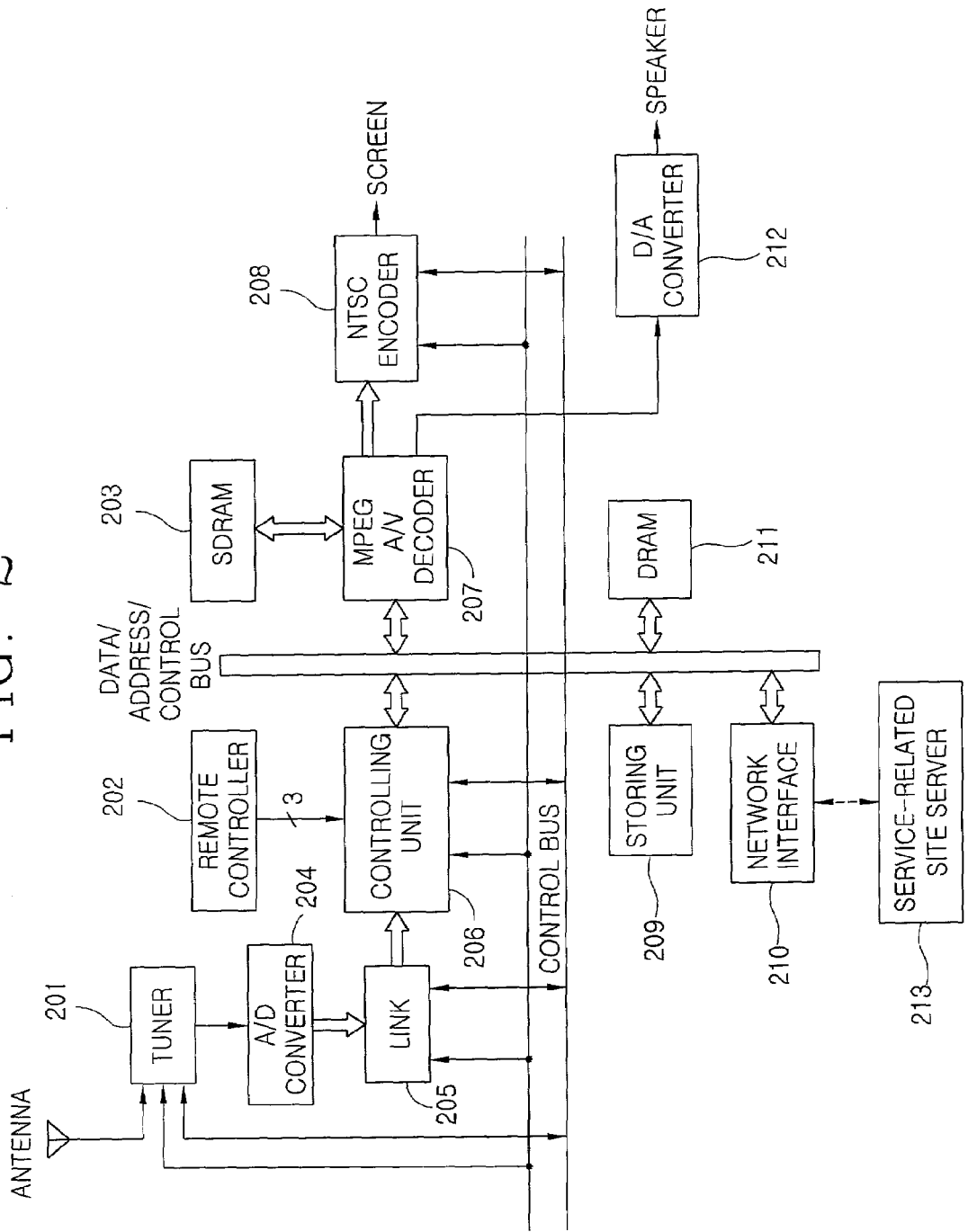
FIG. 2 is a block diagram illustrating a construction of a digital TV in accordance with the present invention.

FIG. 2 is a block diagram illustrating a construction of a digital TV in accordance with the present invention.

As depicted in FIG. 2, the digital TV in accordance with the present invention comprises a tuner 201 for tuning in to a broadcast signal of a user selection channel among broadcast signals of each channel received through an antenna, an analog/digital converter 204 for converting the user selection broadcast signal into a digital signal, a link 205 for correcting an error by demodulating the digital signal, converting it into a transport stream format and outputting it, a remote controller interface 202 for inputting a user request signal, a controlling unit 206 for demultiplexing the transport stream in accordance with the user request signal or outputting a control signal for controlling the tuner 201, a MPEG (Moving Picture Expert Group) A/V decoder 207 for receiving the demultiplexed signal from the controlling unit 206, converting it into decoded audio and video signals and outputting them, a NTSC (National Television System Committee) encoder 208 for outputting a luminance signal and a color signal by encoding the decoded video signal in order to display it on a screen, a digital/analog converter 212 for converting the decoded audio signal into an analog audio signal and outputting it through a speaker, a network interface 210 for performing a two-way communication such as an internet etc., a service-related site server 213 for providing an error checkup menu or a function information menu about a product through the network interface 210, a SDRAM (Synchronous Dynamic Random Access Memory) 203 for storing data required in the decoding process, a DRAM (Dynamic Random Access Memory) 211 for storing temporary data in accordance with the control operation of the controlling unit 206, and a storing unit 209 for storing a program for the control operation of the controlling unit 206, the proper information of the pertinent product and contact information of the service-related site.

Herein, the controlling unit 206 contacts to the service-related site server 213 by using the contact information of the service-related site stored in the storing unit 209, transmits the proper information of a pertinent product (TV), is inputted an order code corresponding to the user selection menu from the service-related site server 213, and controls in order to display information corresponding to the order code on a screen.

Figure 3:
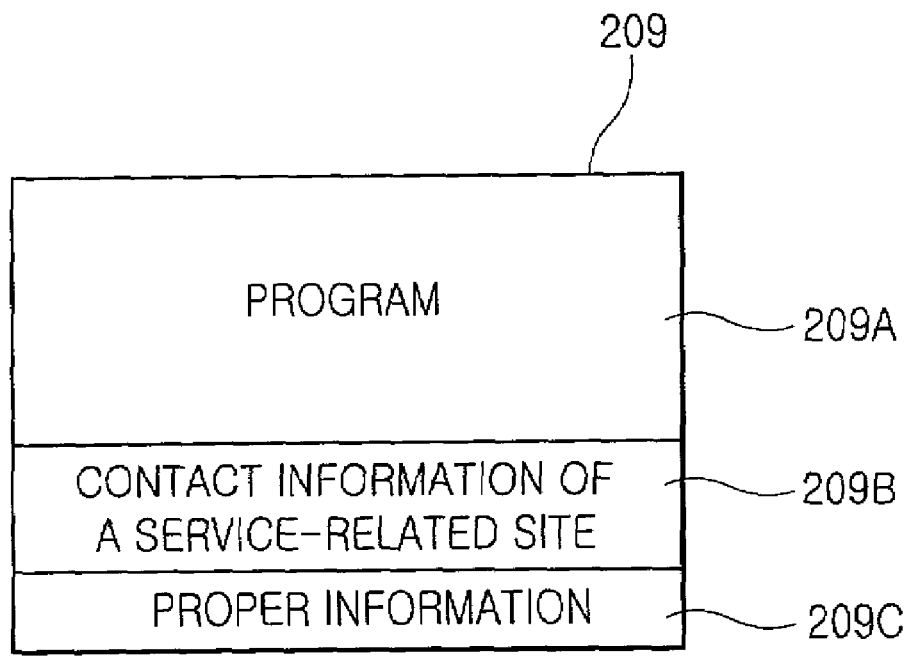
FIG. 3 illustrates a storing unit of FIG. 2 in detail.

FIG. 3 illustrates the storing unit of FIG. 2 in detail.

As depicted in FIG. 3, the storing unit 209 comprises a region 209A for storing a program for a control operation of the controlling unit 206, a region 209B for storing the contact information of the service-related site, and a region 209C for storing the proper information of the pertinent product. Herein, the contact information can be a URL (uniform Resource Locator) etc.

Hereinafter, the operation of the digital TV in accordance with the present invention will now be described in detail.

First, when a user has a difficulty to understand a function of a product (TV) or judges an error occurrence of the product (TV), the user inputs (pushes) a checkup key (or remote controller) (not shown) in order to get information about the product (TV), and the controlling unit 206 contacts to the service-related site server 213 through the network interface unit 210 by referencing the contact information of the service-related site stored in advance in the storing unit 209.

When the controlling unit 206 contacts to the service-related site server 213, the controlling unit 206 transmits the proper information of the pertinent product stored in advance in the storing unit 209 to the service-related site server 213. Herein, the proper information can be a model name or a model number of the TV.

The service-related site server 213 is inputted the proper information, and transmits the service menu information to the controlling unit 206.

After that, the controlling unit 206 displays the service menu information on the screen of the TV. Herein, the user selects a user request menu by referencing the service menu information displayed on the screen. Herein, the service menu information describes an error checkup menu of the TV and a function information menu of the TV etc. In addition, the function information menu is for providing information describing each function of the TV in detail.

After that, when the user selects the user request menu in the service menu information, the controlling unit 206 transmits selection information corresponding to the user request menu to the service-related site server 213 through the network interface 241.

The service-related site server 213 is inputted the proper information, and transmits the service menu information to the controlling unit 206.

After that, the controlling unit 206 displays the service menu information on the screen of the TV. Herein, the user selects the user request menu by referencing the service menu information displayed on the screen. Herein, the service menu information describes the error checkup menu of the TV and function information menu of the TV etc. In addition, the function information menu is for providing information describing each function of the TV in detail.

After that, when the user selects the user request menu in the service menu information, the controlling unit 206 transmits selection information corresponding to the user selection menu to the service-related site server 213 through the network interface 241.

The service-related site server 213 transmits the order code for transmitting information corresponding to the selection information by receiving the selection information to the controlling unit 206 through the network interface 210.

Herein, the controlling unit 206 is inputted the order code, and controls to display information corresponding to the user selection menu among functions included in the service menu information on a screen.

Accordingly, the error list information for checking the TV and function information of the TV etc. can be provided by performing a two-way communication between the TV and service-related site server 213.

Hereinafter, the control method of the TV in FIGS. 2 and 3 in accordance with the present invention will now be described in detail with reference to accompanying FIG. 4.

Figure 4:
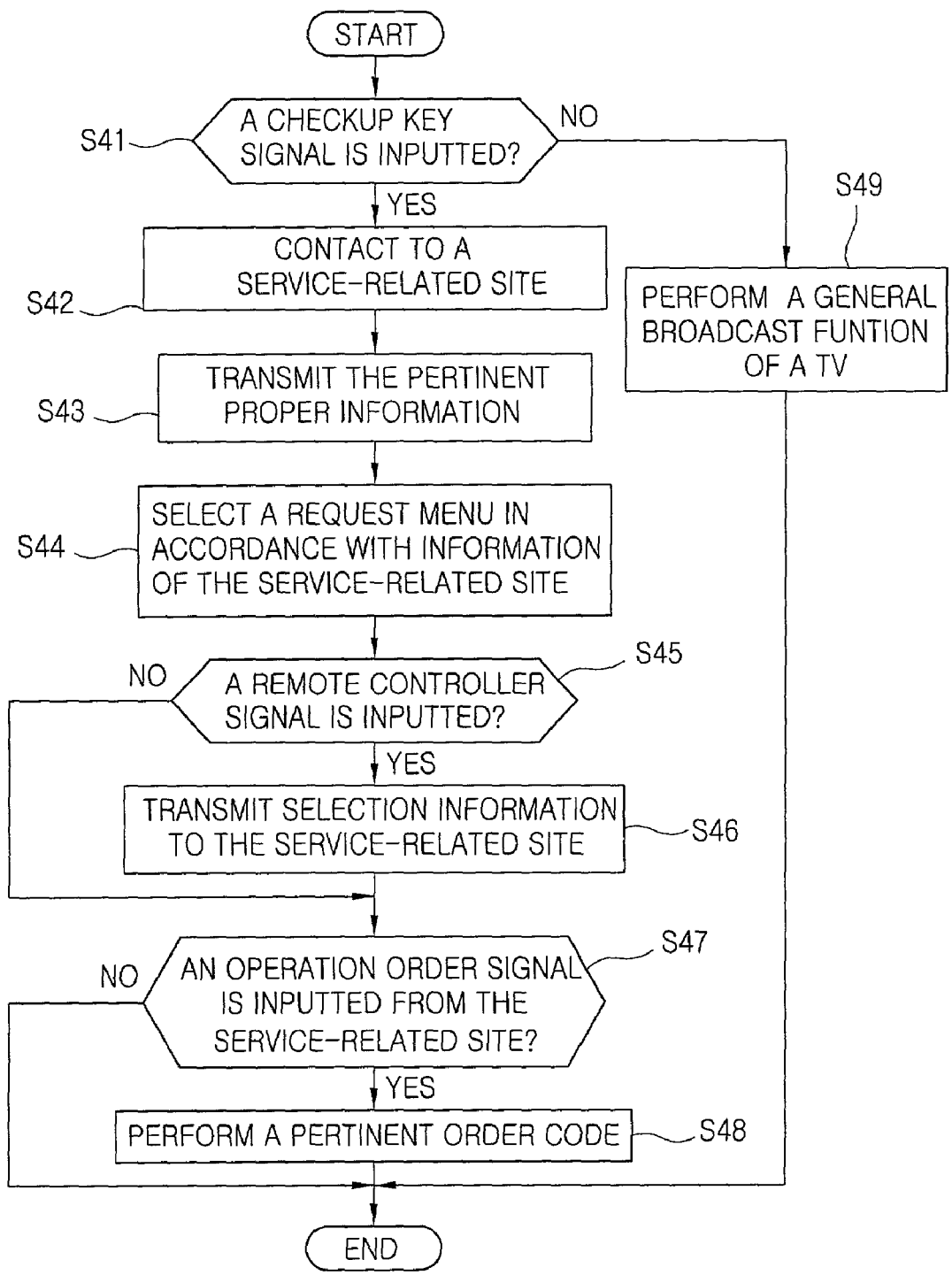
FIG. 4 is a flow chart illustrating a control method of a digital TV in accordance with the present invention.

FIG. 4 is a flow chart illustrating the control method of the digital TV in accordance with the present invention.

First, the controlling unit 206 judges whether a checkup key signal (not shown) is inputted from a user S41.

When the checkup signal is inputted, the controlling unit 206 contacts to the service-related site server 213 through the network interface 210 by referencing the contact information of the service-related site stored in advance in the storing unit 209 S42.

When the controlling unit 206 contacts to the service-related site server 213, the controlling unit 206 transmits the proper information of the pertinent is product (TV) to the service-related site server 213 S43.

After that, in the service menu information, the user request menu is selected S44, the controlling unit 206 judges whether a remote controller signal is inputted S45.

When the remote controller signal is inputted, the controlling unit 206 transmits selection information to the service-related site server 213 through the network interface 210. Herein, the selection information is a signal for receiving information corresponding to the user selection menu in the service menu information.

After that, the controlling unit 206 judges whether an operation order signal is inputted from the service-related site server 213 S47. In other words, the controlling unit 206 judges whether information corresponding to the selection information is inputted from the service-related site server 213.

When the operation order signal is inputted from the service-related site server 213, the controlling unit 206 performs an order code according to the operation order signal S48. In other words, the controlling unit 206 is inputted information corresponding to the user selection menu, and controls to display it on the screen of the TV.

In the meantime, when the checkup key signal is not inputted, the controlling unit 206 performs a function of the TV S43. Herein, the function of the TV means a function of a general TV which selects a broadcast signal of a user request channel and outputs video and audio signals corresponding to the selected broadcast signal.

As descried above, the proper information of the product (TV) (the proper information of a pertinent product) is inputted from a manufacturer to the service-related site server 213, the service-related site server 213 outputs the error list information for performing the error checkup of the product and function information of the product etc. to the controlling unit 206 of the TV through the network interface 210. It will now be described in detail with reference to accompanying FIGS. 5A and 5B.

Figure 5A:
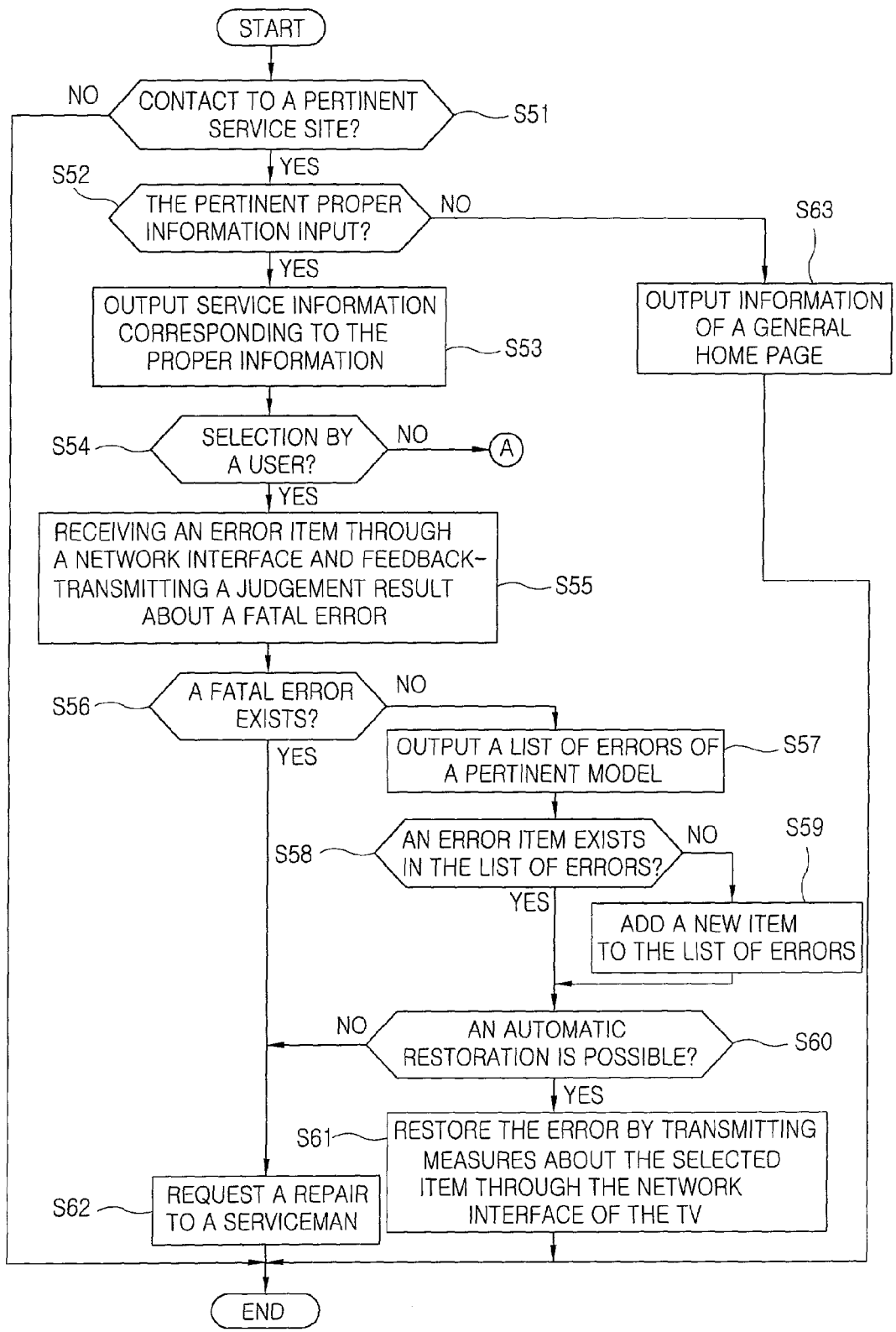
FIGS. 5A and 5B are flow charts illustrating an operation of a service-related site server of a digital TV in accordance with the present invention.
Figure 5B:
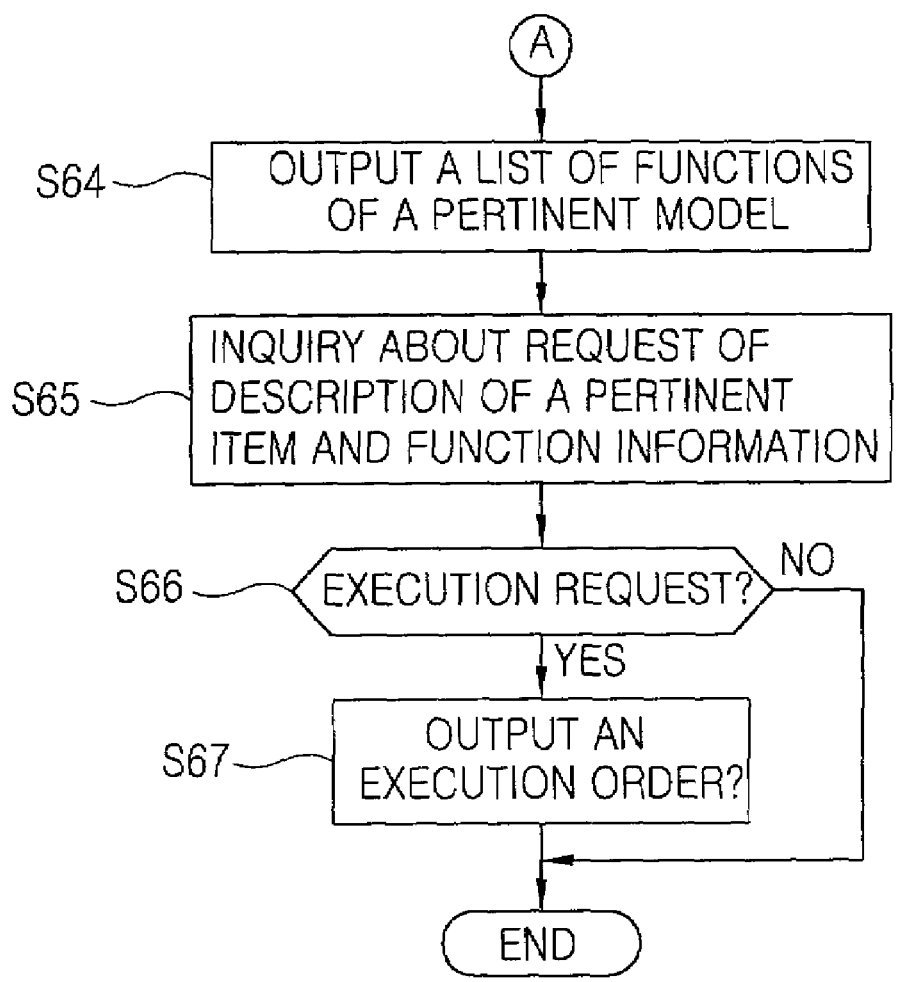

FIGS. 5A and 5B are flow charts illustrating an operation of a service-related site server of a digital TV in accordance with the present invention.

First, when the TV contacts to the service-related site server 213 S51, the service-related site server 213 judges whether the proper information of the pertinent product is inputted through the network interface 210 of the TV S52.

When the proper information of the pertinent product is inputted, the service-related site server 213 outputs the service menu information to the controlling unit 206. Herein, the user can select request information in the service menu information displayed on the screen of the TV.

After that, the service-related site server 213 judges whether the selection information is inputted from the controlling unit 206 of the TV S54. In other words, it judges which menu in the error checkup menu or function information menu included in the service menu information displayed on the screen of the TV is selected by the user S54.

When the user selects the error checkup menu, the controlling unit 206 transmits an error item occurred in the TV to the service-related site server 213 through the network interface 210, and receives a judgement result from the service-related site server 213 whether the error item is a fatal error S55. Herein, the service-related site server 213 judges whether there is a fatal error in the error item S56.

After that, when the fatal error exists in the error item, the service-related site server 213 requests repair for the fatal error to a serviceman S62.

In the meantime, when there is no fatal error in the error item, the service-related site server 213 outputs a list of errors for checking the pertinent model to the controlling unit 206 S57. Herein, the controlling unit 206 judges whether the error item exists in the list of the error S58.

When the error item does not exist in the list of the error, the controlling unit 206 generates a new item about a breakdown of the error, and adds it to the list of errors S59.

When the error item exists in the list of errors or a new item about the present breakdown of errors is added to the list of errors, the service-related site server 213 judges whether the error item is an automatic restoration (recovery) possible error S60.

When the error item is the automatic restoration possible error, the service-related site server 213 restores the error item by transmitting measures about the error item to the controlling unit 206 through the network interface 210 of the TV. Herein, the measures mean information for restoring the error automatically by being included in the list of errors. For example, when the error item is "A picture is not displayed on a screen", the controlling unit 206 sets automatically video related data as a standard state (forwarding state). In addition, when the error occurred in the TV is an error caused by immature of a user, the controlling unit 206 sets the TV as the standard state (forwarding state), when an error is detected in periodical checking of IC-related data set in the TV, the controlling unit 206 resets the TV as the standard state (forwarding state).

In the meantime, when the error item is not the automatic restoration possible error, the service-related site server 213 performs the requesting process S62 for requesting a repair about the fatal error to the serviceman.

Meanwhile, when the user selects the function information menu in the service menu information displayed on the screen of the TV, the service-related site server 213 outputs the list of functions for describing a function of a pertinent model to the controlling unit 206 S64.

After that, the controlling unit 206 displays the list of functions on the screen. Herein, the controlling unit 206 asks to the user whether the user needs description about a user request item and function information in the list of functions displayed on the screen S65.

The service-related site server 213 judges whether the user requests description about a user request item and function information in the list of functions displayed on the screen S66. Herein, the function information means information corresponding to video or audio-related functions of the TV or information corresponding to a special function. In addition, the information corresponding to the special function means information for describing an automatic channel setting, a manual channel setting etc. in detail.

When the user requests the description about request item and function information, the service-related site server 213 outputs an execution order to the controlling unit 206 of the TV through the network interface 210. Herein, the controlling unit 206 receives the execution order, and controls in order to display the description about the user request item and function information on the screen of the TV.

Hereinafter, examples of the list of errors and list of functions will now be described in detail with reference to accompanying FIGS. 6A and 6B.

Figure 6A:
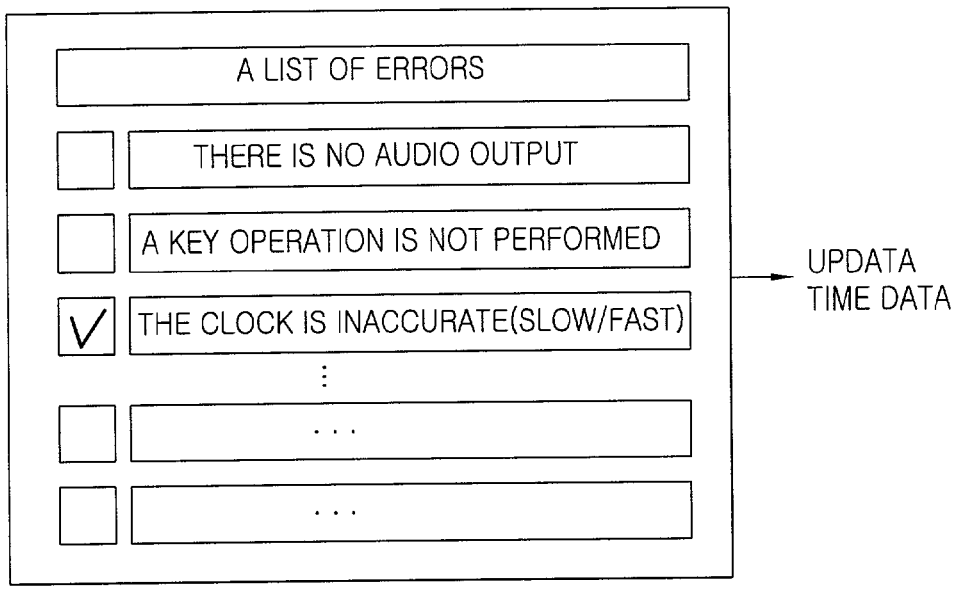
FIGS. 6A and 6B illustrate examples of a list of errors and a list of functions in accordance with the present invention.

FIG. 6A illustrates examples of a list of errors in accordance with the present invention.

As depicted in FIG. 6A, when the user selects the error checkup menu, it is judged whether the error occurred in the TV is a fatal error, when the error is not the fatal error, the list of errors is displayed on the screen of the TV. In other words, when the user selects an item of "The clock is inaccurate (slow/fast)", the controlling unit 206 of the TV senses it, and updates time data.

Figure 6B:
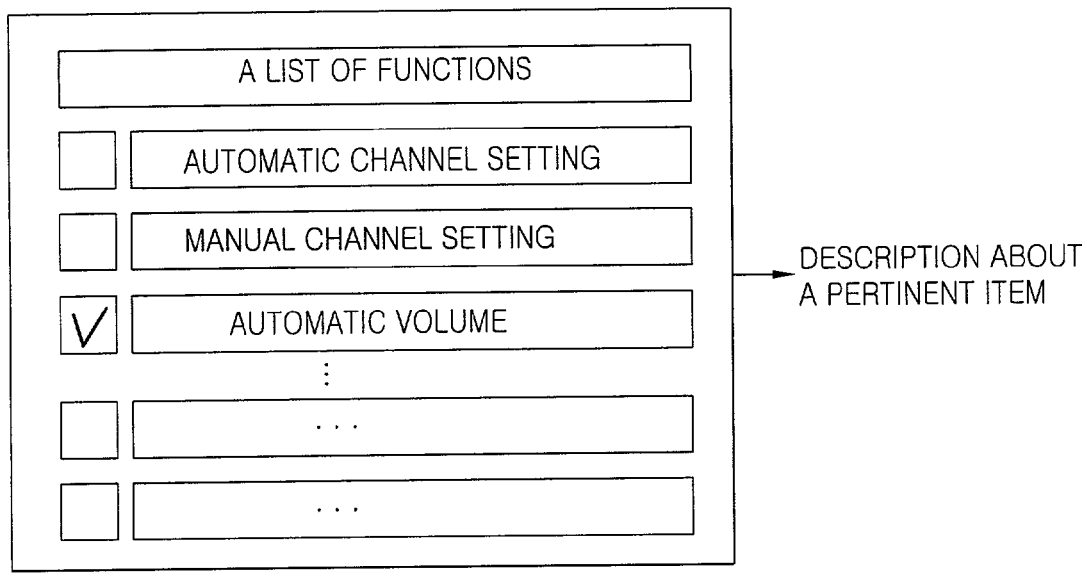

FIG. 6B illustrates examples of a list of functions in accordance with the present invention.

As depicted in FIG. 6B, when the user selects the function information menu, the list of functions is displayed on the screen, when the user selects a user request item in the displayed list of functions, description about a pertinent item and an inquiry about function information request etc. are performed through the controlling unit 206 of the TV.

After that, when the user selects the error checkup menu, it is feedback-received whether the error is a fatal error after transmitting the error item through the network interface unit 210 of the TV, when the error is an automatic restoration impossible error, restoration (repair) is asked to the serviceman, when the error is not a fatal error, the list of errors of a pertinent model is outputted, when the error item does not exist in the list of errors, the user can add a breakdown (condition) of the error as a new item.

When the error item is selected or added, it is judged whether the automatic error restoration is possible, when the automatic error restoration is not possible, a restoration (repair) is asked to the serviceman, when the automatic error restoration is possible, restoration about the error item is performed by transmitting measures about the selected item to the controlling unit 206 through the network interface 210 of the TV.

In the meantime, when the user does not understand well functions of the product and selects the function information menu, functions of the pertinent model is displayed, detailed explanation about a user request item is outputted with video and audio, when the user selects the pertinent item, the TV controlling unit 206 performs the pertinent function through the network interface 210.

As described above, the digital TV and control method of the same in accordance with the present invention is capable of restoring an error occurred in the TV automatically by contacting to the service-related site server by using the remote controller or checkup key, and managing a breakdown of the error when the error occurs in the TV.

In addition, the digital TV and control method of the same in accordance with the present invention can give convenience to the user by providing detailed information about the product to the user when there is an inquiry about the TV from the user.

What is claimed is:

1. A television (TV) reproducing video and audio signals by receiving a broadcast signal, comprising:

a storing unit for storing proper information of the TV, and contact information of a TV service site server, the proper information including a model name or a model number of the TV and the contact information comprising a URL of the TV service site server;

a network interface unit for facilitating two way communications between the TV service site server and the TV; and a controlling unit for contacting the TV service site server by use of the contact information and transmitting the proper information to the TV service site server in response to a checkup key input by a user, and the controlling unit for controlling display of a service menu received from the TV service site server through the network interface unit in response to contacting the TV service site server, the service menu including a function information menu and an error checkup menu of the TV, wherein upon the user selecting the function checkup menu from the service menu, the controlling unit controls the display of the function information menu to provide information describing each function of the TV pertaining to the proper information in detail, upon the user selecting the error checkup menu from the service menu, the controlling unit transmits an error item that occurred in the TV to the TV service site server through the network interface unit and in response the TV service site server transmits a list of errors pertinent to the proper information to the TV through the network interface unit only when the TV service site server has determined the error item to be non-fatal, after receiving the list of errors from the TV service site server, upon the controlling unit determining that the error item is in the received list of errors and upon the TV service site server determining that the error item is automatically restorable, the controlling unit receives an error restoring information from the TV service site server based on the error item that occurred in the TV, wherein the controlling unit automatically restores the error item that occurred in the TV by setting data or state of the TV pertaining to the error item to a standard state based on the error restoring information, and wherein when the TV service site server determines that the error item transmitted by the controlling unit through the network interface unit after the user selected the error checkup menu is a fatal error, the TV service site server requests a repair for the fatal error to a serviceman.

2. The TV according to claim 1, wherein upon the controlling unit determining that the error item is not in the list of errors, the controlling unit generates a new item about the error item that occurred in the TV and adds the new item to the list of errors, wherein the TV service site server determines whether the added new item is automatically restorable, and transmits error restoring information for the new item to the controlling unit through the network interface unit when it is determined to be automatically restorable,
   wherein the controlling unit automatically restores the error item that occurred in the TV by setting data or state of the TV pertaining to the error item to a standard state based on the error restoring information for the new item transmitted by the TV service site server.

3. The TV according to claim 1, wherein the function information is information corresponding to video or audio-related functions or information corresponding to a special function.

4. In a television (TV) equipped with a storing unit for storing proper information of the television and contact information of a TV service site server, a control method performed by a controlling unit of the TV, comprising:
   contacting a TV service site server through a network interface unit of the TV by referencing the contact information and transmitting the proper information to the TV service site server when a checkup key signal is input by a user, the proper information including a model name or a model number of the TV and the contact information comprising a URL of the TV service site server, and the network interface unit facilitating two way communications between the TV service site server and the TV;
   receiving from the TV service site server through the network interface unit, a service menu corresponding to the proper information of the TV, the service menu including an error checkup menu and a function information menu from the TV service site server, the controlling unit controlling the display of the received service menu;
   transmitting selection information according to a selection of the user from the received service menu to the TV service site server, wherein
      upon a user selection of the function information menu from the service menu, the TV service site server transmits to the controlling unit of the TV, information describing each function of the TV pertaining to the proper information in detail,
      upon a user selection of the error checkup menu from the service menu, the controlling unit transmits an error item that occurred in the TV to the TV service site server through the network interface unit and in response receives a list of errors pertinent to the proper information of the TV from the TV service site server only when the TV service site server has determined the error item to be non-fatal,
      after receiving the list of errors from the TV service site server, upon the controlling unit determining that the error item is in the received list of errors and upon the TV service site server determining that the error item is automatically restorable, the controlling unit receives an error restoring information for the error item that occurred in the TV from the TV service site server, wherein the controlling unit automatically restores the error item by setting data or state of the TV pertaining to the error item to a standard state based on the error restoring information, and
      wherein when the TV service site server determines that the error item transmitted by the controlling unit through the network interface unit after the user selected the error checkup menu is a fatal error, the TV service site server requests a repair for the fatal error to a serviceman.

5. The control method of the TV according to claim 4, wherein the error restoring information includes measures for automatically restoring the data or state of a TV function pertaining to the error item that occurred in the TV.

6. The control method of the TV according to claim 5, wherein upon the controlling unit determining that the error item is not in the list of errors, the controlling unit generates a new item about the error item that occurred in the TV and adds the new item to the list of errors,
   wherein the TV service site server determines whether the added new item is automatically restorable, and transmits error restoring information for the new item to the controlling unit through the network interface unit when it is determined to be automatically restorable, and
   wherein the controlling unit automatically restores the error item that occurred in the TV by setting data or state of the TV pertaining to the error item to a standard state based on the error restoring information of the new item transmitted by the TV service site server.

7. The control method of the TV according to claim 4, wherein after the controlling unit receives information describing each function of the TV pertaining to the proper information in detail from the TV service site server, upon selection of the function checkup menu, the controlling unit displays the received information by outputting a list of functions of the TV on a screen, and the controlling unit further displaying details of a function information requested by the user from the list of functions on the screen.

8. The control method of the TV according to claim 7, wherein the function information comprises information corresponding to video or audio-related function or information corresponding to a special function.

9. A television (TV) reproducing video and audio signals by receiving a broadcast signal, comprising:
   a storing unit for storing TV information of the TV, and contact information of a TV service Internet site, the TV information including a model name or a model number of the TV and the contact information comprising a URL of the TV service Internet site;
   a network interface unit for facilitating two way communications between the TV service Internet site and the TV; and
   a controlling unit for contacting the TV service Internet site by use of the contact information and transmitting the TV information to the TV service Internet site in response to a checkup key input by a user, and the controlling unit for controlling display of a service menu received from the TV service Internet site through the network interface unit in response to contacting the TV service Internet site, the service menu including a function information menu and an error checkup menu of the TV, wherein
      upon the user selecting the function checkup menu from the service menu, the controlling unit controls the display of the function information menu to provide information describing each function of the TV pertaining to the TV information in detail,
      upon the user selecting the error checkup menu from the service menu, the controlling unit transmits an error item that occurred in the TV to the TV service Internet site through the network interface unit and in response the TV service Internet site transmits a list of errors pertinent to the TV information to the TV through the network interface unit only when the TV service Internet site has determined the error item to be non-fatal,
      after receiving the list of errors from the TV service Internet site, upon the controlling unit determining that the error item is in the received list of errors and upon the TV service Internet site determining that the error item is automatically restorable, the controlling unit receives an error restoring information from the TV service Internet site based on the error item that occurred in the TV, wherein the controlling unit automatically restores the error item that occurred in the TV by setting data or state of the TV pertaining to the error item to a standard state based on the error restoring information, and wherein when the TV service Internet site determines that the error item transmitted by the controlling unit through the network interface unit after the user selected the error checkup menu is a fatal error, the TV service Internet site requests a repair for the fatal error to a serviceman.

10. The television of claim 9, further comprising a display.

\* \* \* \* \*